United States Patent
Kimura et al.

(10) Patent No.: US 10,041,714 B2
(45) Date of Patent: Aug. 7, 2018

(54) AIR CONDITIONER

(71) Applicant: FUJITSU GENERAL LIMITED, Kanagawa (JP)

(72) Inventors: Takashi Kimura, Kanagawa (JP); Kuniko Hayashi, Wakayama (JP)

(73) Assignee: FUJITSU GENERAL LIMITED, Tokyo (JP)

( * ) Notice: Subject to any disclaimer, the term of this patent is extended or adjusted under 35 U.S.C. 154(b) by 63 days.

(21) Appl. No.: 14/909,997

(22) PCT Filed: Jan. 22, 2014

(86) PCT No.: PCT/JP2014/051163
§ 371 (c)(1),
(2) Date: Feb. 4, 2016

(87) PCT Pub. No.: WO2015/019628
PCT Pub. Date: Feb. 12, 2015

(65) Prior Publication Data
US 2016/0178261 A1    Jun. 23, 2016

(30) Foreign Application Priority Data
Aug. 8, 2013  (JP) .................................. 2013-165037

(51) Int. Cl.
*F25B 41/04*    (2006.01)
*F25B 49/02*    (2006.01)
(Continued)

(52) U.S. Cl.
CPC ............ *F25B 49/022* (2013.01); *F24F 11/30* (2018.01); *F25B 13/00* (2013.01); *F25B 41/046* (2013.01);
(Continued)

(58) Field of Classification Search
CPC ............................ F25B 41/046; F25B 47/025; F25B 2313/005; F25B 2313/0315
(Continued)

(56) References Cited

U.S. PATENT DOCUMENTS 5,265,436 A * 11/1993 Murata .................... F25B 13/00
                                                                                165/207
6,314,750 B1 * 11/2001 Ishikawa ............ B60H 1/00921
                                                                                62/129
(Continued)

FOREIGN PATENT DOCUMENTS

JP       63259342 A  * 10/1988
JP       63259342 A2   10/1988
(Continued)

OTHER PUBLICATIONS

JP 2006183979—translation.*
(Continued)

*Primary Examiner* — Jianying Atkisson
*Assistant Examiner* — Paul Schwarzenberg
(74) *Attorney, Agent, or Firm* — Rankin, Hill & Clark LLP

(57) ABSTRACT

A rotational speed Cr of a compressor 21 during a defrosting operation is controlled within a control range that corresponds to a capacity ratio P, a total sum Pi of rated capacity of an indoor unit, or a refrigerant pipe length Lr. Accordingly, even in the case where a refrigerant circulation amount during the defrosting operation is reduced due to an installation state of an air conditioner 1, it is possible to prevent suction pressure from being significantly reduced and falling below a performance lower limit value of the compressor 21. Thus, damage to the compressor 21 can be prevented. In addition, it is possible to prevent a case where the suction pressure falls below the performance lower limit
(Continued)

value of the compressor 21 and thus low-pressure protection control is executed. Therefore, a case where the restoration of the heating operation is delayed does not occur.

5 Claims, 4 Drawing Sheets

(51) Int. Cl.
  *F25B 13/00*   (2006.01)
  *F25B 47/02*   (2006.01)
  *F24F 11/30*   (2018.01)
(52) U.S. Cl.
  CPC ...... *F25B 47/025* (2013.01); *F25B 2313/005* (2013.01); *F25B 2313/0314* (2013.01); *F25B 2313/0315* (2013.01); *F25B 2600/0253* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *Y02B 30/741* (2013.01)
(58) Field of Classification Search
  USPC ........................................................ 62/228.3
  See application file for complete search history.

(56) References Cited

U.S. PATENT DOCUMENTS

| | | | |
|---|---|---|---|
| 6,662,578 B2 * | 12/2003 | Pham | A47F 3/04 62/154 |
| 6,755,620 B2 * | 6/2004 | Nakamura | F04D 27/0261 417/2 |

FOREIGN PATENT DOCUMENTS

| | | | | |
|---|---|---|---|---|
| JP | 64063757 | A2 | | 3/1989 |
| JP | 1217146 | A2 | | 8/1989 |
| JP | 11337234 | A | * | 12/1999 |
| JP | 11337234 | A2 | | 12/1999 |
| JP | 2006183979 | A | * | 7/2006 |
| JP | 2009228928 | A2 | | 10/2009 |
| WO | WO 2013081359 | A1 | * | 6/2013 ............ G05B 19/02 |

OTHER PUBLICATIONS

International Search Report dated Apr. 28, 2014 filed in PCT/JP2014/051163.
Written Opinion of the International Searching Authority dated Apr. 17, 2014 filed in PCT/JP2014/051163 and English translation thereof.

* cited by examiner

FIG. 2

300a COMPRESSOR ROTATIONAL SPEED TABLE

| P=Pi/Po | Cr (rps) | |
|---|---|---|
| | Min. | Max. |
| P < A | 56 | 74 |
| P ≥ A | 72 | 90 |

P: CAPACITY RATIO
Pi: TOTAL SUM OF INDOOR UNIT CAPACITY (kW)
Po: TOTAL SUM OF OUTDOOR UNIT CAPACITY (kW)
Cr: COMPRESSOR ROTATIONAL SPEED (rps)

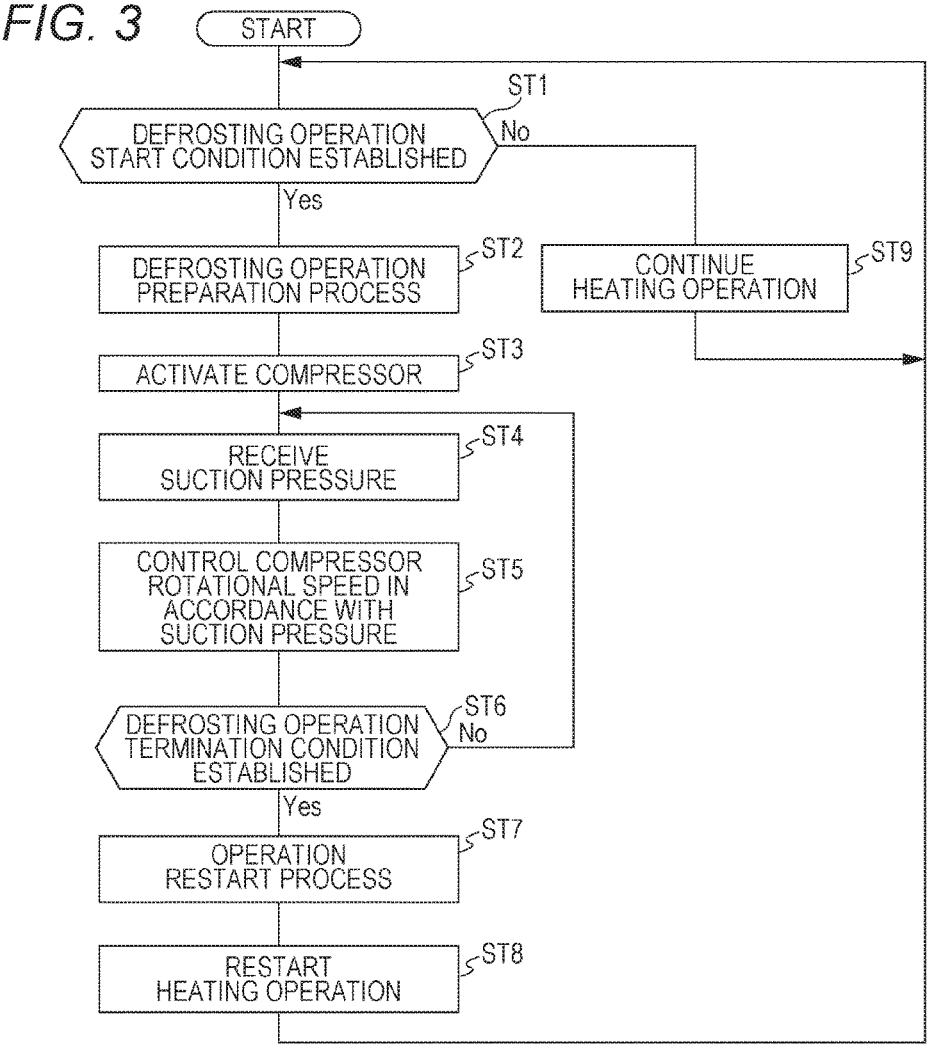

FIG. 5

300c COMPRESSOR ROTATIONAL SPEED TABLE

| P=Pi/Po | Lr (m) | Cr (rps) | |
|---|---|---|---|
| | | Min. | Max. |
| P<A | Lr≥C | 45 | 63 |
| | Lr<C | 56 | 74 |
| P≥A | Lr≥C | 62 | 80 |
| | Lr<C | 72 | 90 |

P: CAPACITY RATIO
Pi: TOTAL SUM OF INDOOR UNIT CAPACITY (kW)
Po: TOTAL SUM OF OUTDOOR UNIT CAPACITY (kW)
Lr: REFRIGERANT PIPE LENGTH FOR
    CONNECTING INDOOR UNIT AND OUTDOOR UNIT (m)
Cr: COMPRESSOR ROTATIONAL SPEED (rps)

AIR CONDITIONER

TECHNICAL FIELD

The present invention relates to an air conditioner in which at least one outdoor unit and at least one indoor unit are mutually coupled by plural refrigerant pipes.

BACKGROUND ART

An air conditioner in which at least one outdoor unit and at least one indoor unit are mutually coupled by plural refrigerant pipes has been suggested. In the case where a temperature of an outdoor heat exchanger becomes equal to or less than 0° C. when this air conditioner performs a heating operation, the outdoor heat exchanger may be frosted. When the outdoor heat exchanger is frosted, ventilation to the outdoor heat exchanger is inhibited by the frost, and thus heat exchange efficiency in the outdoor heat exchanger may be degraded. Thus, when frosting occurs to the outdoor heat exchanger, a defrosting operation has to be performed to defrost the outdoor heat exchanger.

For example, in an air conditioner described in Patent Literature 1, an outdoor unit that includes a compressor, a four-way valve, an outdoor heat exchanger, and an outdoor fan is coupled to two indoor units, each of which includes an indoor heat exchanger, an indoor expansion valve, and an indoor fan, via a gas refrigerant pipe and a liquid refrigerant pipe. In the case where, in this air conditioner, a defrosting operation is performed during a heating operation, the rotation of the outdoor fan and the rotation of the indoor fan are stopped. In conjunction with this, the compressor is stopped once, the four-way valve is switched such that the outdoor heat exchanger is shifted from a state of functioning as an evaporator to a state of functioning as a condenser, and the compressor is activated again. When the outdoor heat exchanger functions as the condenser, a high-temperature refrigerant discharged from the compressor flows into the outdoor heat exchanger and melts frost formed on the outdoor heat exchanger. Thus, the outdoor heat exchanger can be defrosted.

By the way, when the defrosting operation is performed, a rotational speed of the compressor is preferably increased to be as high as possible. It is because, when the defrosting operation is performed by increasing the rotational speed of the compressor, an amount of the high-temperature refrigerant that is discharged from the compressor and flows into the outdoor heat exchanger is increased, a defrosting operation time is thus shortened, and the heating operation can be restored at an early stage. For this reason, the compressor is usually driven at a predetermined maximum value of the rotational speed (for example, 90 rps) during the defrosting operation.

However, there is a case where suction pressure of the compressor is reduced because condensation pressure is not increased by the heat exchange conducted between the frost and the refrigerant in the outdoor heat exchanger during the defrosting operation, and because of an ambient air temperature, an indoor temperature, a difference in height between an installation position of the outdoor unit and an installation position of the indoor unit, and the like during the defrosting operation. In the case where the compressor keeps driven at the above-described maximum value of the rotational speed when a degree of a reduction in the suction pressure is large, the suction pressure may be significantly reduced and fall below a performance lower limit value. Then, when the suction pressure falls below the performance lower limit value, the compressor may be damaged. In addition, such a problem that low-pressure protection control for stopping the compressor to prevent damage to the compressor is executed, a defrosting operation time is thus extended, and restoration of the heating operation is delayed is inherent.

In view of the above, such control that the suction pressure of the compressor is detected during the defrosting operation, and the rotational speed of the compressor is reduced at a time that the detected suction pressure becomes equal to or less than threshold pressure (for example, 0.1 Mpa) that is higher by a predetermined value than the performance lower limit value, so as to suppress the reduction in the suction pressure is executed. At this time, a predetermined minimum value (for example, 72 rps) is set as the rotational speed of the compressor, and the compressor is controlled such that the rotational speed thereof does not become the minimum value or lower.

During the defrosting operation, the rotational speed of the compressor is controlled within a control range that is defined by the maximum value (90 rps) and the minimum value (72 rps) of the rotational speed of the compressor described above in accordance with the suction pressure of the compressor detected during the defrosting operation. Accordingly, while the damage to the compressor and shifting to the low-pressure protection control are prevented, the defrosting operation is continuously performed. Thus, a delay in the restoration of the heating operation is prevented.

It should be noted that the above-described maximum value and minimum value of the rotational speed of the compressor are obtained in advance by a test or the like. The maximum value is the rotational speed of the compressor at which defrosting of the outdoor heat exchanger is completed as early as possible while the degree of the reduction in the suction pressure of the compressor is taken into consideration. Meanwhile, the minimum value is such a rotational speed that, if the rotational speed of the compressor is reduced therefrom, the defrosting operation is performed for a long time or the defrosting operation cannot be performed due to a significant reduction in a refrigerant circulation amount or stop of circulation of the refrigerant caused by a reduction in a pressure difference between discharge pressure and the suction pressure of the compressor.

CITATION LIST

Patent Literature

PATENT LITERATURE 1: JP-A-2009-228928

SUMMARY OF THE INVENTION

Problems to be Solved by the Invention

However, as described above, even in the case where the rotational speed of the compressor is controlled within the predetermined control range in accordance with the suction pressure of the compressor when the defrosting operation is performed, the suction pressure of the compressor may be significantly reduced and fall below the performance lower limit value of the compressor due to the reduction in the refrigerant circulation amount caused by an installation condition, which will be described below.

In the air conditioner, size of the outdoor heat exchanger and that of the indoor heat exchanger are each the size that corresponds to rated capacity required for each of the outdoor unit and the indoor unit. An amount of the frost formation on the outdoor heat exchanger is an amount of the frost formation that corresponds to the size of the outdoor heat exchanger. As the size of the outdoor heat exchanger is increased, the amount of the frost formation is also increased. Thus, in the case where the outdoor heat exchanger is large, a further large amount of the high-temperature refrigerant has to flow through the outdoor heat exchanger in comparison with a case where the outdoor heat exchanger is small.

Meanwhile, the indoor expansion valve that has a flow passage cross-sectional area corresponding to size of the indoor heat exchanger is coupled to the indoor heat exchanger that functions as an evaporator during the defrosting operation. The indoor expansion valve with the smaller flow passage cross-sectional area is coupled as the size of the indoor heat exchanger is reduced. Accordingly, in the case where the indoor heat exchanger is small, an amount of the refrigerant that passes through the indoor expansion valve, that is, an amount of the refrigerant that flows out from the indoor unit to the gas refrigerant pipe is reduced in comparison with a case where the indoor heat exchanger is large.

Thus, as a difference in size between the outdoor heat exchanger and the indoor heat exchanger is increased, the amount of the refrigerant that flows out from the indoor heat exchanger with respect to the amount of the refrigerant that flows into the outdoor heat exchanger is reduced. Consequently, the refrigerant is accumulated in the outdoor heat exchanger or the liquid refrigerant pipe, and the refrigerant circulation amount in the air conditioner is reduced. Then, as the refrigerant circulation amount is reduced, the degree of the reduction in the suction pressure is increased.

As described above, a following problem is inherent. In a state that the suction pressure is reduced by the reduction in the refrigerant circulation amount due to the difference in size (the installation condition) between the outdoor heat exchanger and the indoor heat exchanger, in the case where the defrosting operation is performed by controlling the rotational speed of the compressor within the same control range as in a case of an installation condition in which the suction pressure is not reduced, the suction pressure may be significantly reduced and fall below the performance lower limit value due to the high rotational speed of the compressor. Then, when the suction pressure falls below the performance lower limit value, the compressor may be damaged. Alternatively, the low-pressure protection control for stopping the compressor to prevent the damage to the compressor is executed. Thus, the defrosting operation time is extended, and the restoration of the heating operation is delayed.

In addition, such a problem that, in the case where the control range of the rotational speed of the compressor is set in accordance with the case of the installation condition in which the suction pressure is reduced, the defrosting operation is performed by reducing the rotational speed of the compressor more than necessary in the case of the installation condition in which the suction pressure is not reduced, the defrosting operation time is thus extended, and the restoration of the heating operation is delayed, is inherent.

The present invention solves the above-described problem. An object of the present invention is to provide an air conditioner that prevents damage to a compressor and a delay in restoration of a heating operation by executing defrosting operation control that corresponds to an installation condition.

Solutions to the Problems

In order to solve the above problem, an air conditioner of the present invention includes: at least one outdoor unit having a compressor, a flow passage switching unit, an outdoor heat exchanger, a low-pressure detector, and an outdoor unit controller; at least one indoor unit having an indoor heat exchanger; and at least one liquid pipe and at least one gas pipe for coupling the outdoor unit and the indoor unit. The low-pressure detector detects suction pressure that is pressure of a refrigerant suctioned into the compressor. The outdoor unit controller controls a rotational speed of the compressor at a time that a defrosting operation is performed within a predetermined rotational speed control range in accordance with the suction pressure received from the low-pressure detector, and the rotational speed control range is defined in accordance with a capacity ratio that is a value obtained by dividing a total sum of rated capacity of the indoor unit by a total sum of rated capacity of the outdoor unit.

In addition, plural control ranges are defined as the rotational speed control range of the compressor during the defrosting operation in accordance with the total sum of the rated capacity of the indoor unit, instead of the above-described capacity ratio. Furthermore, the rotational speed control range of the compressor during the defrosting operation is defined in accordance with either one of the capacity ratio and the total sum of the rated capacity of the indoor unit, and a refrigerant pipe length that is lengths of the liquid pipe and the gas pipe.

Advantageous Effects of the Invention

The air conditioner of the present invention that is configured as described above controls the rotational speed of the compressor during the defrosting operation within the control range that corresponds to the capacity ratio, the total sum of the rated capacity of the indoor unit, or the refrigerant pipe length as described above. Accordingly, even in the case where a refrigerant circulation amount during the defrosting operation is reduced due to an installation state of the air conditioner, it is possible to prevent the suction pressure from being significantly reduced and falling below a performance lower limit value of the compressor. Thus, damage to the compressor can be prevented. In addition, it is possible to prevent a case where the suction pressure falls below the performance lower limit value of the compressor and thus low-pressure protection control is executed. Therefore, a case where the defrosting operation time is extended and restoration of a heating operation is delayed due to interruption of the defrosting operation by the low-pressure protection control does not occur.

BRIEF DESCRIPTION OF THE DRAWINGS

FIG. 2 is a compressor rotational speed table in the embodiment of the invention.

FIG. 3 is a flowchart for explaining a process during a defrosting operation in the embodiment of the present invention.

FIG. 4 is a compressor rotational speed table in a second embodiment of the present invention.

FIG. 5 is a compressor rotational speed table in a third embodiment of the present invention.

DESCRIPTION OF EMBODIMENTS

Figure 1:
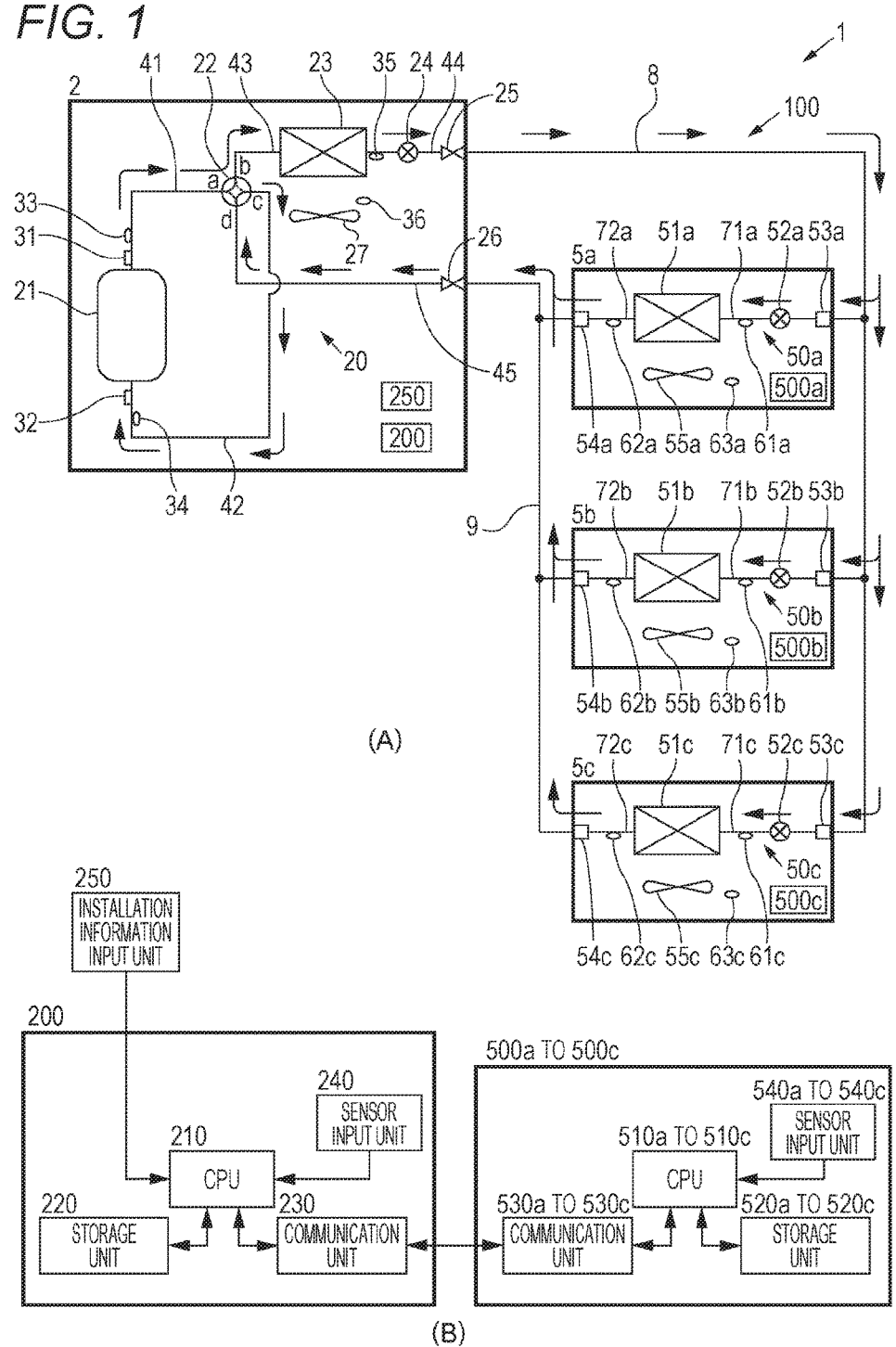
FIG. 1 is an explanatory view of an air conditioner in an embodiment of the present invention, in which (A) is a refrigerant circuit diagram, and (B) is a block diagram of an outdoor unit controller and an indoor unit controller.

A detailed description will hereinafter be made on embodiments of the present invention based on the accompanying drawings. A description will be made by raising an example of an air conditioner in which three indoor units are coupled in parallel to one outdoor unit and in which a cooling operation or a heating operation can simultaneously be performed by all of the indoor units as the embodiments. It should be noted that the present invention is not limited to the following embodiments, but various modifications can be made thereto within a scope of the gist of the present invention.

Example 1

As depicted in FIG. 1(A), an air conditioner 1 of this example includes: one outdoor unit 2 that is installed on the outside of a building or the like; and three indoor units 5a to 5c that are coupled in parallel to the outdoor unit 2 via a liquid pipe 8 and a gas pipe 9. In detail, one end of the liquid pipe 8 is coupled to a closing valve 25 of the outdoor unit 2, and the other end thereof is branched and respectively coupled to liquid pipe coupling portions 53a to 53c of the indoor units 5a to 5c. In addition, one end of the gas pipe 9 is coupled to a closing valve 26 of the outdoor unit 2, and the other end thereof is branched and respectively coupled to gas pipe coupling portions 54a to 54c of the indoor units 5a to 5c. Thus, a refrigerant circuit 100 of the air conditioner 1 is configured.

First, the outdoor unit 2 will be described. The outdoor unit 2 includes a compressor 21, a four-way valve 22 as a flow passage switching unit, an outdoor heat exchanger 23, an outdoor expansion valve 24, the closing valve 25, to which the one end of the liquid pipe 8 is coupled, the closing valve 26, to which the one end of the gas pipe 9 is coupled, and an outdoor fan 27. Then, each of devices other than the outdoor fan 27 is mutually coupled by each refrigerant pipe, which will be described in detail below, and constitutes an outdoor unit refrigerant circuit 20 for constituting a part of the refrigerant circuit 100.

The compressor 21 is a variable-capacity-type compressor that can change operation capacity by being driven by a motor, not depicted, whose rotational speed is controlled by an inverter. A refrigerant discharge side of the compressor 21 is coupled to a port a of the four-way valve 22, which will be described below, via a discharge pipe 41. In addition, a refrigerant suction side of the compressor 21 is coupled to a port c of the four-way valve 22, which will be described below, via an intake pipe 42.

The four-way valve 22 is a valve for switching a flow direction of the refrigerant and includes four ports of a, b, c, and d. As described above, the port a is coupled to the refrigerant discharge side of the compressor 21 via the discharge pipe 41. A port b is coupled to one of refrigerant entry/exit openings of the outdoor heat exchanger 23 via a refrigerant pipe 43. As described above, the port c is coupled to the refrigerant suction side of the compressor 21 via the intake pipe 42. A port d is coupled to the closing valve 26 via an outdoor unit gas pipe 45.

The outdoor heat exchanger 23 exchanges heat between the refrigerant and ambient air that is taken into the outdoor unit 2 by rotation of the outdoor fan 27, which will be described below. As described above, one of the refrigerant entry/exit openings of the outdoor heat exchanger 23 is coupled to the port b of the four-way valve 22 via the refrigerant pipe 43, and the other of the refrigerant entry/exit openings is coupled to the closing valve 25 via an outdoor unit liquid pipe 44.

The outdoor expansion valve 24 is provided in the outdoor unit liquid pipe 44. The outdoor expansion valve 24 is an electronic expansion valve, and adjusts an amount of the refrigerant that flows into the outdoor heat exchanger 23 or an amount of the refrigerant that flows out from the outdoor heat exchanger 23 when an opening degree thereof is adjusted.

The outdoor fan 27 is formed of a resin material and arranged in the vicinity of the outdoor heat exchanger 23. The outdoor fan 27 is rotated by an undepicted fan motor so as to take the ambient air into the outdoor unit 2 from an undepicted inlet, and discharges the ambient air that has exchanged heat with the refrigerant in the outdoor heat exchanger 23 to the outside of the outdoor unit 2 from an undepicted outlet.

In addition to the configuration that has been described so far, the outdoor unit 2 is provided with various types of sensors. As depicted in FIG. 1(A), the discharge pipe 41 is provided with: a high-pressure sensor 31 for detecting pressure of the refrigerant that is discharged from the compressor 21, and a discharge temperature sensor 33 for detecting a temperature of the refrigerant that is discharged from the compressor 21. The intake pipe 42 is provided with: a low-pressure sensor 32 as a suction pressure detector for detecting pressure of the refrigerant that is suctioned into the compressor 21; and a suction temperature sensor 34 for detecting a temperature of the refrigerant that is suctioned into the compressor 21.

The outdoor heat exchanger 23 is provided with a heat exchange temperature sensor 35 for detecting frosting during the heating operation or melting of frost during a defrosting operation. In addition, an ambient air temperature sensor 36 for detecting a temperature of the ambient air that flows into the outdoor unit 2, that is, an ambient air temperature is provided near the undepicted inlet of the outdoor unit 2.

The outdoor unit 2 includes an outdoor unit controller 200. The outdoor unit controller 200 is installed on a control board that is housed in an undepicted electric component box of the outdoor unit 2. As depicted in FIG. 1(B), the outdoor unit controller 200 includes a CPU 210, a storage unit 220, a communication unit 230, and a sensor input unit 240.

The storage unit 220 includes a ROM or a RAM, and stores a control program of the outdoor unit 2, detection values that correspond to detection signals from the various sensors, control states of the compressor 21 and the outdoor fan 27, a compressor rotational speed table, which will be described below, and the like. The communication unit 230 is an interface that performs communication among the indoor units 5a to 5c. The sensor input unit 240 receives detection results of the various sensors in the outdoor unit 2 and outputs the detection results to the CPU 210.

The CPU 210 receives the detection result of each of the sensors in the outdoor unit 2, just as described, via the sensor input unit 240. In addition, the CPU 210 receives control signals, that are transmitted from the indoor units 5a to 5c, via the communication unit 230. Based on the received detection results and control signals, the CPU 210 executes drive control of the compressor 21 and the outdoor fan 27. Furthermore, based on the received detection results and control signals, the CPU 210 executes switching control of the four-way valve 22. Moreover, based on the received detection results and control signals, the CPU 210 executes opening degree control of the outdoor expansion valve 24.

The outdoor unit 2 includes an installation information input unit 250. The installation information input unit 250 is arranged on a side surface of an undepicted housing of the outdoor unit 2, and can be operated from the outside.

Although not depicted, the installation information input unit 250 is formed of a setting button, a determination button, and a display portion. The setting button includes ten keys, for example, and is used to input information on a refrigerant pipe length (lengths of the liquid pipe 8 and the gas pipe 9), which will be described below, and information on rated capacity of the indoor units 5a to 5c. The determination button is used to confirm the information that is input by the setting button. The display portion displays various types of the input information, current operation information of the outdoor unit 2, and the like. However, the installation information input unit 250 is not limited to what has been described above. For example, the setting button may be a DIP switch, a dial switch, or the like.

Next, the three indoor units 5a to 5c will be described. The three indoor units 5a to 5c respectively include indoor heat exchangers 51a to 51c, indoor expansion valves 52a to 52c, the liquid pipe coupling portions 53a to 53c, to which the branched other ends of the liquid pipe 8 are respectively coupled, the gas pipe coupling portions 54a to 54c, to which the branched other ends of the gas pipe 9 are respectively coupled, and indoor fans 55a to 55c. Then, the devices other than the indoor fans 55a to 55c are mutually coupled by the refrigerant pipes, which will be described in detail below, and constitute indoor unit refrigerant circuits 50a to 50c, each of which constitutes a part of the refrigerant circuit 100.

It should be noted that, since configurations of the indoor units 5a to 5c are all the same, only the configuration of the indoor unit 5a will be described in the following description, and the indoor units 5b and 5c will not be described. In addition, in FIG. 1, last letters of the reference signs given to components of the indoor unit 5a are changed from a to b and c, and the changed reference signs are given to components of the indoor units 5b and 5c that correspond to the components of the indoor unit 5a.

The indoor heat exchanger 51a exchanges heat between the refrigerant and indoor air that is taken into the indoor unit 5a from an undepicted inlet by the indoor fan 55a, which will be described below. One of refrigerant entry/exit openings of the indoor heat exchanger 51a is coupled to the liquid pipe coupling portion 53a via an indoor unit liquid pipe 71a, and the other of the refrigerant entry/exit openings is coupled to the gas pipe coupling portion 54a via an indoor unit gas pipe 72a. The indoor heat exchanger 51a functions as an evaporator when the indoor unit 5a performs the cooling operation, and functions as a condenser when the indoor unit 5a performs the heating operation.

It should be noted that each of the refrigerant pipes is coupled to the liquid pipe coupling portion 53a and the gas pipe coupling portion 54a by welding, a flare nut, or the like.

The indoor expansion valve 52a is provided in the indoor unit liquid pipe 71a. The indoor expansion valve 52a is an electronic expansion valve. An opening degree thereof is adjusted in accordance with requested cooling capacity in the case where the indoor heat exchanger 51a functions as the evaporator, and is adjusted in accordance with requested heating capacity in the case where the indoor heat exchanger 51a functions as the condenser.

The indoor fan 55a is formed of a resin material and arranged in the vicinity of the indoor heat exchanger 51a. The indoor fan 55a is rotated by an undepicted fan motor so as to take the indoor air into the indoor unit 5a from the undepicted inlet, and supplies the indoor air that has exchanged heat with the refrigerant in the indoor heat exchanger 51a to the inside from an undepicted outlet.

In addition to the configuration that has been described so far, the indoor unit 5a is provided with various types of sensors. A liquid-side temperature sensor 61a for detecting a temperature of the refrigerant that flows into the indoor heat exchanger 51a or of the refrigerant that flows out from the indoor heat exchanger 51a is provided between the indoor heat exchanger 51a and the indoor expansion valve 52a in the indoor unit liquid pipe 71a. A gas-side temperature sensor 62a for detecting a temperature of the refrigerant that flows out from the indoor heat exchanger 51a or of the refrigerant that flows into the indoor heat exchanger 51a is provided in the indoor unit gas pipe 72a. In addition, an indoor temperature sensor 63a for detecting a temperature of the indoor air that flows into the indoor unit 5a, that is, an indoor temperature is provided in the vicinity of the undepicted inlet of the indoor unit 5a.

The indoor unit 5a also includes an indoor unit controller 500a. The indoor unit controller 500a is installed on a control board that is housed in an undepicted electric component box of the indoor unit 5a. As depicted in FIG. 1(B), the indoor unit controller 500a includes a CPU 510a, a storage unit 520a, a communication unit 530a, and a sensor input unit 540a.

The storage unit 520a includes a ROM or a RAM, and stores a control program of the indoor unit 5a, detection values that correspond to detection signals from the various sensors, information on setting related to an air conditioning operation by a user, and the like. The communication unit 530a is an interface that performs communication between the outdoor unit 2 and the other indoor units 5b and 5c. The sensor input unit 540a receives detection results of the indoor unit 5a from the various sensors and outputs the detection results to the CPU 510a.

The CPU 510a receives the detection result of each of the sensors in the indoor unit 5a, just as described, via the sensor input unit 540a. In addition, the CPU 510a receives a signal that includes operation information, timer operation setting, or the like set by the user through an operation of an undepicted remote controller via an undepicted remote controller light receiving portion. Based on the received detection results and the signal transmitted from the remote controller, the CPU 510a executes opening degree control of the indoor expansion valve 52a and drive control of the indoor fan 55a. In addition, the CPU 510a transmits an operation start/stop signal or a control signal that includes the operation information (a set temperature, the indoor temperature, and the like) to the outdoor unit 2 via the communication unit 530a.

Next, a description will be made on a flow of the refrigerant and an operation of each component in the refrigerant circuit 100 during the air conditioning operation of the air conditioner 1 in this embodiment by using FIG. 1(A). It should be noted that a case where the indoor units 5a to 5c perform the cooling operation will be described in the following description, and a detailed description on a case where the heating operation is performed will not be made. Arrows in FIG. 1(A) indicate the flow of the refrigerant during the cooling operation.

As depicted in FIG. 1(A), in the case where the indoor units 5a to 5c perform the cooling operation, the outdoor unit controller 200 switches the four-way valve 22 to a state indicated by a solid line, that is, such that the port a and the port b of the four-way valve 22 communicate with each other and the port c and the port d communicate with each other. Accordingly, the outdoor heat exchanger 23 functions as the condenser, and the indoor heat exchangers 51a to 51c function as the evaporators.

The high-pressure refrigerant that is discharged from the compressor 21 flows through the discharge pipe 41, flows into the four-way valve 22, flows out from the four-way valve 22, flows through the refrigerant pipe 43, and flows into the outdoor heat exchanger 23. The refrigerant that flows into the outdoor heat exchanger 23 exchanges heat with the ambient air that is taken into the outdoor unit 2 by the rotation of the outdoor fan 27, and is condensed. The refrigerant that flows out from the outdoor heat exchanger 23 flows through the outdoor unit liquid pipe 44 and flows into the liquid pipe 8 via the outdoor expansion valve 24 and the closing valve 25 that are fully opened.

The refrigerant that flows through the liquid pipe 8, branches, and flows into each of the indoor units 5a to 5c flows through the indoor unit liquid pipes 71a to 71c, and is decompressed when passing through the indoor expansion valves 52a to 52c. Accordingly, the refrigerant becomes the low-pressure refrigerant. The refrigerant that flows into the indoor heat exchangers 51a to 51c from the indoor unit liquid pipes 71a to 71c exchanges heat with the indoor air that is taken into the indoor units 5a to 5c by the rotation of the indoor fans 55a to 55c, and is evaporated. Just as described, the inside in which the indoor units 5a to 5c are installed is cooled when the indoor heat exchangers 51a to 51c function as the evaporators and the indoor air that has exchanged heat with the refrigerant in the indoor heat exchangers 51a to 51c is blown into the inside from the undepicted outlets.

The refrigerant that flows out from the indoor heat exchangers 51a to 51c flows through the indoor unit gas pipes 72a to 72c and flows into the gas pipe 9. The refrigerant that flows through the gas pipe 9 and flows into the outdoor unit 2 via the closing valve 26 flows through the outdoor unit gas pipe 45, the four-way valve 22, and the intake pipe 42, is suctioned into the compressor 21, and is compressed again.

As described above, the cooling operation of the air conditioner 1 is performed when the refrigerant circulates through the refrigerant circuit 100.

It should be noted that, in the case where the indoor units 5a to 5c perform the heating operation, the outdoor unit controller 200 switches the four-way valve 22 to a state indicated by a broken line, that is, such that the port a and the port d of the four-way valve 22 are communicated with each other and the port b and the port c are communicated with each other. Accordingly, the outdoor heat exchanger 23 functions as the evaporator, and the indoor heat exchangers 51a to 51c function as the condensers.

In the case where a defrosting operation start condition, which will be described below, is established when the indoor units 5a to 5c perform the heating operation, the outdoor heat exchanger 23 that functions as the evaporator may be frosted. The defrosting operation start conditions include, for example, a case where a state that a refrigerant temperature detected by the heat exchange temperature sensor 35 is lower by 5° C. or more than the ambient air temperature detected by the ambient air temperature sensor 36 continues for 10 minutes or longer after a lapse of 30 minutes of a heating operation time (a time that the heating operation is continued from a time point at which the air conditioner 1 is activated in the heating operation or a time point at which the heating operation is restored from the defrosting operation), a case where a predetermined time (for example, 180 minutes) has elapsed since the last defrosting operation is terminated, and the like. The defrosting operation start condition indicates that an amount of frost formation on the outdoor heat exchanger 23 is in a level that interferes with the heating capacity.

In the case where the defrosting operation start condition is established, the outdoor unit controller 200 stops the compressor 21 to stop the heating operation. Furthermore, the outdoor unit controller 200 switches the refrigerant circuit 100 to a state during the above-described cooling operation and restarts the compressor 21 at a predetermined rotational speed so as to start the defrosting operation. It should be noted that the outdoor fan 27 and the indoor fans 55a to 55c are stopped when the defrosting operation is performed. The operation of the refrigerant circuit 100 other than this case is the same as that when the cooling operation is performed. Thus, the detailed description will not be made.

In the case where a defrosting operation termination condition, which will be described below, is established when the air conditioner 1 performs the defrosting operation, it is considered that the frost generated on the outdoor heat exchanger 23 is melted. In the case where the defrosting operation termination condition is established, the outdoor unit controller 200 stops the defrosting operation by stopping the compressor 21, and switches the refrigerant circuit 100 to the state during the heating operation. Thereafter, the outdoor unit controller 200 restarts the heating operation by activating the compressor 21 at a rotational speed that corresponds to the heating capacity required for the indoor units 5a to 5c. The defrosting operation termination conditions include, for example, whether the temperature of the refrigerant detected by the heat exchange temperature sensor 35 has become at least 10° C., the refrigerant flowing out from the outdoor heat exchanger 23, whether a predetermined time (for example, 10 minutes) has elapsed since the defrosting operation is started, and the like. The defrosting operation termination condition is a condition that it is considered that the frost generated on the outdoor heat exchanger 23 has been melted.

Next, a description will be made on an operation, an action, and an effect of the refrigerant circuit according to the present invention in the air conditioner 1 of this embodiment by using FIGS. 1 to 3.

The storage unit 220 that is provided in the outdoor unit control means 200 of the outdoor unit 2 stores a compressor rotational speed table 300a depicted in FIG. 2 in advance. This compressor rotational speed table 300a defines a control range of a rotational speed Cr (unit: rps) of the compressor 21 at a time that the air conditioner 1 performs the defrosting operation in accordance with a capacity ratio P that is obtained by dividing a total sum Pi of indoor unit capacity of the indoor units 5a to 5c by a total sum of rated capacity of the outdoor unit 2 (hereinafter described as a total sum Po of outdoor unit capacity).

More specifically, as depicted in FIG. 2, in the case where the capacity ratio P is lower than a predetermined threshold capacity ratio A (for example, 75%), a minimum value of the compressor rotational speed Cr is set at 56 rps, and a maximum value thereof is set at 74 rps. That is, the control range of the compressor rotational speed Cr is set to be from 56 rps to 74 rps. In addition, in the case where the capacity ratio P is equal to or more than the threshold capacity ratio A, the minimum value of the compressor rotational speed Cr is set at 72 rps, and the maximum value thereof is set at 90 rps. That is, the control range of the compressor rotational speed Cr is set to be from 72 rps to 90 rps.

The maximum value of the compressor rotational speed Cr in the compressor rotational speed table 300a is obtained and defined in advance by a test or the like, and is the rotational speed that is set at first when the air conditioner 1 performs the defrosting operation. As described above, the defrosting operation is preferably terminated at an early stage by increasing the rotational speed of the compressor 21 during the defrosting operation as high as possible. For this reason, the compressor 21 is activated at this maximum value of the compressor rotational speed Cr at the start of the defrosting operation and is controlled to maintain this rotational speed during the defrosting operation.

In addition, the minimum value of the compressor rotational speed Cr in the compressor rotational speed table 300a is also obtained and defined in advance by a test or the like, and is the rotational speed that becomes a lower limit value when rotational speed control of the compressor 21 that will be described below and that corresponds to the suction pressure of the compressor 21 is executed. The minimum value of the compressor rotational speed Cr is such a rotational speed that, if the rotational speed Cr of the compressor 21 is reduced therefrom, the defrosting operation time is extended or the defrosting operation cannot be performed due to the significant reduction in the refrigerant circulation amount or stop of the circulation of the refrigerant caused by the reduction in the pressure difference between the discharge pressure and the suction pressure of the compressor 21.

Since heat is exchanged between the frost and the refrigerant in the outdoor heat exchanger 23 during the defrosting operation, a condensation temperature is not increased, and condensation pressure is not increased, either. In addition, in the case where the ambient air temperature is low, the condensation temperature is not increased, and the condensation pressure is not increased, either. The discharge pressure of the compressor 21 is not increased without an increase in the condensation pressure. Thus, the pressure difference between the discharge pressure and the suction pressure of the compressor 21 is reduced, and the amount of the refrigerant flowing through the gas pipe 9 is reduced. Then, when the amount of the refrigerant flowing through the gas pipe 9 is reduced, the suction pressure of the compressor 21 is reduced.

In the case where the indoor temperature is low during the defrosting operation, an evaporation temperature in each of the indoor heat exchangers 51a to 51c is reduced, thus evaporation pressure is reduced, and the suction pressure of the compressor is reduced. Furthermore, in the case where there is a difference in height between an installation place of the outdoor unit 2 and an installation place of each of the indoor units 5a to 5c, the suction pressure of the compressor 21 is reduced by pressure loss caused by the difference in height.

There is a case where the suction pressure of the compressor 21 is reduced during the defrosting operation by any of the factors that have been described so far. In the case where the compressor 21 keeps driven at the maximum value of the rotational speed Cr when a degree of the reduction is large, the suction pressure may be significantly reduced and fall below a performance lower limit value. Then, when the suction pressure falls below the performance lower limit value, the compressor may be damaged. Alternatively such a problem that the low-pressure protection control for stopping the compressor to prevent the damage to the compressor is executed, thus the defrosting operation time is extended, and the restoration of the heating operation is delayed is inherent.

In view of the above, during the defrosting operation, the suction pressure of the compressor 21 detected by a low-pressure sensor 32 is periodically received, and the control of the rotational speed Cr of the compressor 21 in accordance with the received suction pressure is executed within a control range that is defined in the compressor rotational speed table 300a depicted in FIG. 2. More specifically, when the suction pressure is reduced to be lower than first threshold pressure (for example, 0.1 MPa) that is higher by a predetermined value than the performance lower limit value of the compressor 21, the rotational speed Cr of the compressor 21 is reduced at a predetermined ratio (for example, 6 rps for every 30 seconds). When the suction pressure is increased by the reduction in the rotational speed Cr and the suction pressure becomes equal to or less than second threshold pressure (for example, 0.2 MPa) that is higher than the first threshold pressure, the rotational speed Cr of the compressor 21 is increased at the predetermined ratio (for example, 6 rps every 30 seconds). When the suction pressure is equal to or more than the first threshold pressure and lower than the second threshold pressure, the rotational speed Cr of the compressor 21 is not changed. When the rotational speed Cr of the compressor 21 is controlled, the two different threshold pressures are used. Accordingly, the control of the rotational speed Cr of the compressor 21 can be stabilized (if the rotational speed Cr is controlled by one threshold pressure, the increase/reduction in the rotational speed Cr may be frequently switched).

Next, a reason why the control range of the compressor rotational speed Cr is changed in accordance with the capacity ratio P will be described.

During the defrosting operation, the outdoor heat exchanger 23 functions as the condenser. Accordingly, the high-temperature refrigerant that is discharged from the compressor 21 flows into the outdoor heat exchanger 23 and melts the frost formed thereon. The amount of the frost formation on the outdoor heat exchanger 23 is an amount of the frost formation that corresponds to size of the outdoor heat exchanger 23. As the size of the outdoor heat exchanger 23 is increased, the amount of the frost formation is also increased. Thus, in the case where the outdoor heat exchanger 23 is large, the further large amount of the high-temperature refrigerant has to flow through the outdoor heat exchanger 23 in comparison with a case where the outdoor heat exchanger 23 is small.

Meanwhile, the indoor expansion valves 52a to 52c, each of which has a flow passage cross-sectional area corresponding to size of each of the indoor heat exchangers 51a to 51c, are respectively coupled to the indoor heat exchangers 51a to 51c that function as the evaporators during the defrosting operation. As the size of each of the indoor heat exchangers 51a to 51c is reduced, the indoor expansion valves 52a to 52c with the smaller flow passage cross-sectional areas are respectively coupled thereto. Accordingly, in the case where the indoor heat exchangers 51a to 51c are small, the amount of the refrigerant that can pass through the indoor expansion valves 52a to 52c, that is, the amount of the refrigerant that flows out from the indoor units 5a to 5c to the gas pipe 9 is reduced in comparison with a case where the indoor heat exchangers 51a to 51c are large.

Due to what has been described so far, a refrigerant circulation amount in the refrigerant circuit 10 at a start of the defrosting operation depends on the size of the outdoor heat exchanger 23 and the size of each of the indoor heat exchangers 51a to 51c. As the difference in size between the outdoor heat exchanger 23 and each of the indoor heat exchangers 51a to 51c is increased, the amount of the refrigerant that flows out from the indoor heat exchangers 51a to 51c is reduced with respect to the amount of the refrigerant that flows into the outdoor heat exchanger 23. Accordingly, the refrigerant is accumulated in the outdoor heat exchanger 23 or the liquid pipe 8, and the refrigerant circulation amount in the refrigerant circuit 10 is reduced. Then, as the refrigerant circulation amount in the refrigerant circuit 10 is reduced, the amount of the refrigerant that flows through the gas pipe 9 is reduced and a degree of a reduction in the suction pressure of the compressor 21 is increased.

In a state that the suction pressure of the compressor 21 is significantly reduced due to the difference in size between the outdoor heat exchanger 23 and the indoor heat exchangers 51a to 51c, for example, when the capacity ratio P in the compressor rotational speed table 300a is lower than A, the rotational speed Cr of the compressor 21 is controlled by setting the control range of the rotational speed Cr of the compressor 21 during the defrosting operation as the control range at a time that the capacity ratio P is equal to or more than A: 72 rps to 90 rps. In such a case, the suction pressure may be significantly reduced and fall below the performance lower limit value. When the suction pressure falls below the performance lower limit value, the compressor 21 may be damaged. Alternatively, the low-pressure protection control for stopping the compressor 21 to prevent the damage to the compressor 21 is executed, and thus the defrosting operation time may be extended.

In view of the above, in the present invention, as in the compressor rotational speed table 300a, the capacity ratio P, which is a ratio between the total sum Pi of the indoor unit capacity equivalent to the size of the outdoor heat exchanger 23 and the total sum Po of the outdoor unit capacity equivalent to the size of the indoor heat exchangers 51a to 51c, is used. In the case where the capacity ratio P is lower than the predetermined capacity ratio A, the control range of the rotational speed Cr of the compressor 21 is set from 56 rps to 74 rps, and the defrosting operation is performed while the suction pressure is prevented from being reduced and falling below the performance lower limit value. Then, in the case where the capacity ratio P is equal to or more than the predetermined capacity ratio A, the degree of the reduction in the suction pressure is small, and there is only a small possibility that the suction pressure falls below the performance lower limit value. Accordingly, the rotational speed Cr of the compressor 21 is set in the control range from 72 rps to 90 rps and is controlled such that the defrosting operation is terminated as early as possible.

Next, a description will be made on control in the air conditioner 1 of this embodiment at a time that the defrosting operation is performed by using FIGS. 1 to 3. FIG. 3 depicts a flow of process executed by the CPU 210 of the outdoor unit control means 200 in the case where the air conditioner 1 performs the defrosting operation. In FIG. 3, ST indicates a step, and a numeral following this indicates a step number. It should be noted that, in FIG. 3, the description will be centered on the process related to the present invention, and the process other than this, for example, a general process related to the air conditioner, such as control of the refrigerant circuit that corresponds to operation conditions including a set temperature, an air volume, and the like instructed by the user will not be described.

In the initial setting during the installation, the air conditioner 1 stores the rated capacity of each of the indoor units 5a to 5c, which is input from the installation information input unit 250, in the storage unit 220. At this time, the CPU 210 calculates the total sum Pi of the indoor unit capacity by using the stored rated capacity of each of the indoor units 5a to 5c. The CPU 210 calculates the capacity ratio P by dividing the total sum Pi of the indoor unit capacity by the total sum Po of the rated capacity of the outdoor unit 2 (in the case of this embodiment, since the one outdoor unit 2 is provided, the total sum Po is the rated capacity of the outdoor unit 2) that is stored in the storage unit 220 in advance. Then, the CPU 210 refers to the compressor rotational speed table 300a stored in the storage unit 220, and extracts and stores the rotational speed Cr of the compressor 21, which correspond to the calculated capacity ratio P, in the storage unit 220.

When the air conditioner 1 is performing the heating operation, the CPU 210 determines whether the defrosting operation start condition has been established (ST1). As described above, the defrosting operation start condition is, for example, the case where the state that the refrigerant temperature detected by the heat exchange temperature sensor 35 is lower by 5° C. or more than the ambient air temperature detected by the ambient air temperature sensor 36 continues for 10 minutes or longer after the lapse of 30 minutes of the heating operation time. The CPU 210 receives the refrigerant temperature detected by the heat exchange temperature sensor 35 and the ambient air temperature detected by the ambient air temperature sensor 36, so as to determine whether the above condition has been established.

If the defrosting operation start condition has not been established in ST1 (ST1—No), the CPU 210 continues the heating operation (ST9) and returns the process to ST1. If the defrosting operation start condition has been established (ST1—Yes), the CPU 210 executes a defrosting operation preparation process (ST2). In the defrosting operation preparation process, the CPU 210 stops the compressor 21 and the outdoor fan 27 and switches the four-way valve 22 such that the ports a and b communicate with each other and that the ports c and d communicate with each other. Accordingly, the refrigerant circuit 100 is brought into a state that the outdoor heat exchanger 23 functions as the condenser and the indoor heat exchangers 51a to 51c function as the evaporators, that is, the state at the time that the cooling operation is performed, which is depicted in FIG. 1(A). It should be noted that the CPUs 510a to 510c of the indoor units 5a to 5c respectively stop the indoor fans 55a to 55c during the defrosting operation.

Next, the CPU 210 activates the compressor 21 at the rotational speed Cr stored in the storage unit 220 (ST3). The defrosting operation is started in the air conditioner 1 by activating the compressor 21.

Next, the CPU 210 receives the suction pressure of the compressor 21, which is detected by the low-pressure sensor 32 (ST4). Then, the CPU 210 executes the rotational speed control of the compressor 21 by using the received suction pressure (ST5). As described above, the CPU 210 executes the rotational speed control of the compressor 21 in accordance with the received suction pressure within the control range that is defined in the compressor rotational speed table 300a depicted in FIG. 2. More specifically, the CPU 210 reduces the rotational speed Cr of the compressor 21 at the predetermined ratio when the received suction pressure becomes the above-described threshold pressure or lower, and increases the rotational speed Cr of the compressor 21 at the predetermined ratio when the received suction pressure exceeds the threshold pressure.

Next, the CPU 210 determines whether the defrosting operation termination condition has been established (ST6). As described above, the defrosting operation termination condition is, for example, whether the temperature of the refrigerant detected by the heat exchange temperature sensor 35, the refrigerant flowing out from the outdoor heat exchanger 23, has become equal to or more than 10° C. The CPU 210 constantly receives and stores the refrigerant temperature that is detected by the heat exchange temperature sensor 35, in the storage unit 220. The CPU 210 refers to the stored refrigerant temperature and determines whether this has become equal to or more than 10° C., that is, the defrosting operation termination condition has been established. It should be noted that the defrosting operation termination condition is defined in advance by a test or the like and is a condition that it is considered that the frost generated on the outdoor heat exchanger 23 has been melted.

If the defrosting operation termination condition has not been established in ST6 (ST6—No), the CPU 210 returns the process to ST4 and continues the defrosting operation. If the defrosting operation termination condition has been established (ST6—Yes), the CPU 210 executes a heating operation restart process (ST7). In the operation restart process, the CPU 210 stops the compressor 21 and switches the four-way valve 22 such that the ports a and d communicate with each other and the ports b and c communicate with each other. Thus, the refrigerant circuit 100 is brought into a state that the outdoor heat exchanger 23 functions as the evaporator and the indoor heat exchangers 51a to 51c function as the condensers.

Then, the CPU 210 restarts the heating operation (ST8) and returns the process to ST1. In the heating operation, the CPU 210 controls the rotational speeds of the compressor 21 and the outdoor fan 27 as well as the opening degree of the outdoor expansion valve 24 in accordance with the heating capacity that is requested from the indoor units 5a to 5c.

In the embodiment that has been described so far, the description has been made on a case where a worker operates the installation information input unit 250 and manually inputs each capacity of the indoor units 5a to 5c during the installation of the air conditioner. However, the present invention is not limited thereto. For example, the each capacity of the indoor units 5a to 5c may be contained in model information on the indoor units 5a to 5c that is stored in the storage units 520a to 520c of the indoor unit control means 500a to 500c. Furthermore, the CPU 210 of the outdoor unit 2 may be configured to receive this model information from the indoor units 5a to 5c so as to obtain the each capacity of the indoor units 5a to 5c. Here, the model information is configured by including basic information of the indoor units 5a to 5c, such as model names and identification numbers of the indoor units 5a to 5c, in addition to the each capacity of the indoor units 5a to 5c.

Example 2

Next, a description will be made on a second embodiment of the air conditioner of the present invention by using FIG. 4. It should be noted that, since the configuration and the operation performance of the air conditioner and changing of the activation rotational speed of the compressor and the defrosting operation interval in the defrosting operation in accordance with the installation condition are the same as those in the first embodiment, the detailed description thereon will not be made in this embodiment. What differs from the first embodiment is that the control range of the rotational speed of the compressor is defined only in accordance with the total sum Pi of the indoor unit capacity in a compressor rotational speed table.

Similar to the compressor rotational speed table 300a depicted in FIG. 2, a compressor rotational speed table 300b depicted in FIG. 4 is stored in advance in the storage unit 220 of the outdoor unit control means 200. The compressor rotational speed table 300b defines the control range of the rotational speed Cr of the compressor 21 at the time that the air conditioner 1 performs the defrosting operation in accordance with the total sum Pi of the indoor unit capacity.

More specifically, as depicted in FIG. 4, in the case where the total sum Pi of the indoor unit capacity is lower than the predetermined threshold capacity value B (for example, 8 kW), the minimum value of the compressor rotational speed Cr is set at 56 rps, and the maximum value thereof is set at 74 rps. That is, the control range of the compressor rotational speed Cr is set to be from 56 rps to 74 rps. In addition, in the case where the total sum Pi of the indoor unit capacity is equal to or more than the threshold capacity value B, the minimum value of the compressor rotational speed Cr is set at 72 rps, and the maximum value thereof is set at 90 rps. That is, the control range of the compressor rotational speed Cr is set from 72 rps to 90 rps.

Next, a description will be made on a reason why the control range of the rotational speed Cr of the compressor 21 is defined only in accordance with the total sum Pi of the indoor unit capacity in the compressor rotational speed table 300b. The air conditioner 1 that includes the outdoor unit 2 in which the outdoor heat exchanger 23 in size corresponding to the required rated capacity is installed (in this case, the compressor 21 may be an inverter compressor or a constant speed compressor), and the air conditioner 1 that includes the outdoor unit 2, in which the size of the installed outdoor heat exchanger 23 is constant and that can exert various values of the rated capacity by controlling the operation capacity of the compressor 21 are available. Thus, in the air conditioner 1, such as the latter one, that includes the outdoor unit 2 in which the size of the outdoor heat exchanger 23 is constant and the rated capacity differs, even when the rated capacity is selected in accordance with the installation condition, substantially the same outdoor unit 2 is selected. In other words, the selectable outdoor unit 2 is determined.

As described in the first embodiment, in the case where the defrosting operation is performed, the amount of the frost formation on the outdoor heat exchanger 23 is increased as the outdoor heat exchanger 23 is increased in size. Accordingly, in the case where the outdoor heat exchanger 23 is large, the further large amount of the high-temperature refrigerant has to flow through the outdoor heat exchanger 23 to melt the frost formed thereon in comparison with the case where the outdoor heat exchanger 23 is small. Thus, in the case where the selectable outdoor unit 2 is determined as described above (=the size of the outdoor heat exchanger 23 is fixed), the amount of the high-temperature refrigerant that is required for defrosting is the same even when the rated capacity differs.

In the case where the selectable outdoor unit 2 is determined, when the control range of the rotational speed Cr of the compressor 21 is determined in accordance with the capacity ratio P between the total sum Pi of the indoor unit capacity and the total sum Po of the outdoor unit capacity as described in the first embodiment, the defrosting operation is performed by setting the control range of the rotational speed Cr of the compressor 21 from 56 rps to 74 rps as will be described in the following predetermined example even though a possibility that the low-pressure protection control is executed due to the reduction in the suction pressure is low. Thus, efficiency of the defrosting operation may be degraded.

For example, the air conditioner 1 including the indoor units 5a to 5c coupled to the outdoor unit 2 in which the size of the outdoor heat exchanger 23 is all the same, and which can set the rated capacity at 10 kW, 12 kW, and 14 kW by controlling the operation capacity of the compressor 21, that is, the air conditioner 1 whose threshold capacity value B of the total sum Pi of the indoor unit capacity, at which a refrigerant circulation amount is reduced and the suction pressure is significantly reduced when the amount of the high-temperature refrigerant that is required to defrost the outdoor heat exchanger 23 is circulated through the refrigerant circuit 10 during the defrosting operation, is 7.5 kW is considered.

In the case where the control range of the rotational speed Cr of the compressor 21 is changed in accordance with the capacity ratio P which has been described in the first embodiment, is applied to the air conditioner 1 as described above, since the threshold capacity ratio is 75% in the first embodiment, the total sum of the capacity Pi of the indoor units 5a to 5c, which corresponds to the threshold capacity ratio in the case where the rated capacity of the outdoor unit 2 is 10 kW, is 7.5 kW. Similarly, the total sum of the capacity Pi of the indoor units 5a to 5c, which corresponds to the threshold capacity ratio in the case where the rated capacity of the outdoor unit 2 is 12 kW, is 9.0 kW. The total sum of the capacity Pi of the indoor units 5a to Sc, which corresponds to the threshold capacity ratio in the case where the rated capacity of the outdoor unit 2 is 14 kW, is 10.5 kW.

In the case where the rated capacity of the outdoor unit 2 is 10 kW, the total sum of the capacity Pi of the indoor units 5a to 5c, which is calculated with the threshold capacity ratio: 75%, is 7.5 kW. This matches 7.5 kW that is the above-described threshold capacity value B corresponding to the size of the outdoor heat exchanger 23. Thus, in the case where the rated capacity of the outdoor unit 2 is 10 kW, the control range of the rotational speed Cr of the compressor 21 is changed in accordance with the case where the threshold capacity ratio: equal to or more than 75% and the case where the threshold capacity ratio: lower than 75%. Accordingly, when the suction pressure of the compressor 21 may be significantly reduced, the execution of the low-pressure protection control is prevented by controlling the rotational speed Cr of the compressor 21 within the control range from 56 rps to 74 rps. When the suction pressure of the compressor 21 is not possibly significantly reduced, the rotational speed Cr of the compressor 21 is controlled within the control range from 72 rps to 90 rps so as to complete the defrosting operation as early as possible. Such objects of the present invention can appropriately be realized.

On the contrary, in the case where the rated capacity of the outdoor unit 2 is 12 kW or 14 kW, the total sum of the capacity Pi of the indoor units 5a to 5c, which is calculated with the threshold capacity ratio: 75%, is respectively 9.0 kW or 10.5 kW. These are higher than 7.5 kW that is the above-described threshold capacity value B corresponding to the size of the outdoor heat exchanger 23. Then, in the case where the rated capacity of the outdoor unit 2 is 12 kW or 14 kW, the control described in the first embodiment is applied. In such a case, in the case where the rated capacity of the outdoor unit 2 is 12 kW and where the total sum of the capacity Pi of the indoor units 5a to 5c is lower than 9.0 kW, the rotational speed Cr of the compressor 21 is controlled within the control range from 56 rps to 74 rps. In addition, in the case where the rated capacity of the outdoor unit 2 is 14 kW and where the total sum of the capacity Pi of the indoor units 5a to 5c is lower than 10.5 kW, the rotational speed Cr of the compressor 21 is controlled within the control range from 56 rps to 74 rps.

However, 9.0 kW or 10.5 kW, which is the above-described total sum of the capacity Pi of the indoor units 5a to 5c, is higher than 7.5 kW, which is the threshold capacity value B corresponding to the size of the outdoor heat exchanger 23. Thus, in the case where the rated capacity of the outdoor unit 2 is 12 kW or 14 kW and where the total sum of the capacity Pi of the indoor units 5a to 5c is that at which the rotational speed Cr of the compressor 21 can originally be controlled within the control range from 72 rps to 90 rps (Pi: between 7.5 and 8.9 kW in the case where the rated capacity of the outdoor unit 2 is 12 kW, Pi: between 7.5 and 10.4 kW in the case where the rated capacity of the outdoor unit 2 is 14 kW), the rotational speed Cr is controlled within the control range of 56 rps to 74 rps. Therefore, the defrosting operation time may be extended by unnecessarily reducing the rotational speed Cr of the compressor 21 during the defrosting operation.

In this embodiment, in consideration of the problem described above, the air conditioner 1, for which the selectable outdoor unit 2 is determined, has the compressor rotational speed table 300b that defines the control range of the rotational speed Cr of the compressor 21 only in accordance with the total sum Pi of the indoor unit capacity, and determines the control range of the rotational speed Cr of the compressor 21 based on this compressor rotational speed table 300b. Therefore, while a reduction in the low pressure during the defrosting operation can be prevented, the degradation of the efficiency of the defrosting operation, which is caused by unnecessarily reducing the rotational speed Cr of the compressor 21 during the defrosting operation, can be prevented.

Example 3

Next, a description will be made on a third embodiment of the air conditioner of the present invention by using FIG. 5. It should be noted that, since the configuration and the operation performance of the air conditioner and changing of the activation rotational speed of the compressor and the defrosting operation interval in the defrosting operation in accordance with the installation condition are the same as those in the first embodiment, the detailed description thereon will not be made in this embodiment. What differs from the first embodiment is that the control range of the rotational speed of the compressor is defined in consideration of a length of the refrigerant pipe for coupling the outdoor unit and the indoor units in addition to the capacity ratio in a compressor rotational speed table.

Similar to the compressor rotational speed table 300a depicted in FIG. 2, a compressor rotational speed table 300c that is depicted in FIG. 5 is stored in advance in the storage unit 220 of the outdoor unit control means 200. The compressor rotational speed table 300c defines the control range of the rotational speed Cr of the compressor 21 at the time that the air conditioner 1 performs the defrosting operation in accordance with the capacity ratio P and a refrigerant pipe length Lr.

Here, the refrigerant pipe length Lr indicates lengths of the liquid pipe 8 and the gas pipe 9 (unit: m). In this embodiment, a description will be made with a maximum value of the refrigerant pipe length Lr being 50 m. This refrigerant pipe length Lr is determined in accordance with size of a building where the air conditioner 1 is installed and distances from an installation position of the outdoor unit 2 to rooms where the indoor units 5a to 5c are installed.

As depicted in FIG. 5, in the compressor rotational speed table 300c, the control range of the rotational speed Cr of the compressor 21 in the case where the refrigerant pipe length Lr is shorter than a predetermined threshold pipe length C (for example, 40 m), and the control range of the rotational speed Cr of the compressor 21 in the case where the refrigerant pipe length Lr is equal to or more than the threshold pipe length C are defined for each of the case where the capacity ratio P is lower than the predetermined threshold capacity ratio A (for example, 75%) and the case where the capacity ratio P is equal to or more than the threshold capacity ratio A (these are the same as those in the compressor rotational speed table 300a).

More specifically, in the case where the capacity ratio P is lower than the threshold capacity ratio A and where the refrigerant pipe length Lr is equal to or more than the threshold pipe length C, the minimum value of the rotational speed Cr of the compressor 21 is set at 45 rps, and the maximum value thereof is set at 63 rps. That is, the control range of the rotational speed Cr of the compressor 21 is set from 45 rps to 63 rps. In addition, in the case where the capacity ratio P is lower than the threshold capacity ratio A and where the refrigerant pipe length Lr is shorter than the threshold pipe length C, the minimum value of the rotational speed Cr of the compressor 21 is set at 56 rps, and the maximum value thereof is set at 74 rps. That is, the control range of the rotational speed Cr of the compressor 21 is set from 56 rps to 74 rps.

In the case where the capacity ratio P is equal to or more than the threshold capacity ratio A and where the refrigerant pipe length Lr is equal to or more than the threshold pipe length C, the minimum value of the rotational speed Cr of the compressor 21 is set at 62 rps, and the maximum value thereof is set at 80 rps. That is, the control range of the rotational speed Cr of the compressor is set from 62 rps to 80 rps. In addition, in the case where the capacity ratio P is equal to or more than the threshold capacity ratio A and where the refrigerant pipe length Lr is shorter than the threshold pipe length C, the minimum value of the rotational speed Cr of the compressor 21 is set at 72 rps, and the maximum value thereof is set at 90 rps. That is, the control range of the rotational speed Cr of the compressor 21 is set from 72 rps to 90 rps.

Next, a reason why the control range of the rotational speed Cr of the compressor 21 is defined in accordance with the capacity ratio P and the refrigerant pipe length Lr in the compressor rotational speed table 300c will be described. As described in the first embodiment, when the air conditioner 1 performs the defrosting operation, heat is exchanged between the frost and the refrigerant in the outdoor heat exchanger 23, and the ambient air temperature is low. Thus, the condensation pressure is not increased, and the discharge pressure of the compressor 21 is not increased, either. Accordingly, the pressure difference between the discharge pressure and the suction pressure of the compressor 21 is reduced, and the amount of the refrigerant flowing through the gas pipe 9 is reduced. Then, when the amount of the refrigerant flowing through the gas pipe 9 is reduced, the suction pressure of the compressor 21 is reduced.

At this time, as the length of the gas pipe 9, that is, the refrigerant pipe length Lr is increased, the amount of the refrigerant flowing through the gas pipe 9 is reduced, and the amount of the refrigerant suctioned into the compressor 21 is reduced. Thus, the suction pressure of the compressor 21 may be reduced in comparison with a case where the refrigerant pipe length Lr is short.

Thus, in the case where the capacity ratio P is small and the refrigerant pipe length Lr is long, a possibility that the suction pressure falls below the performance lower limit value is increased in comparison with a case where the refrigerant pipe length Lr is short. Similarly, also in the case where the capacity ratio P is large and the refrigerant pipe length Lr is long, the possibility that the suction pressure falls below the performance lower limit value is increased in comparison with the case where the refrigerant pipe length Lr is short.

In this embodiment, in consideration of the problem described above, the compressor rotational speed table 300c that defines the control range of the rotational speed Cr of the compressor 21 in accordance with the capacity ratio P and the refrigerant pipe length Lr is included, and the control range of the rotational speed Cr of the compressor 21 is determined based on this compressor rotational speed table 300c. The control range of the rotational speed Cr is set finely in accordance with the capacity ratio P and the refrigerant pipe length Lr. Thus, while the reduction in the low pressure during the defrosting operation is being further reliably prevented, the degradation of the efficiency of the defrosting operation, which is caused by unnecessarily reducing the rotational speed Cr of the compressor 21, can be prevented.

It should be noted that, in this embodiment, the compressor rotational speed table 300c that defines the control range of the rotational speed Cr of the compressor 21 in accordance with the capacity ratio P and the refrigerant pipe length Lr is provided. As described in the second embodiment, in the case of the air conditioner 1 in which the size of the outdoor heat exchanger 23 is the same and that includes the plural outdoor units 2 with the different rated capacity, the compressor rotational speed table that defines the control range of the rotational speed Cr of the compressor 21 not in accordance with the capacity ratio P but in accordance with the total sum Pi of the indoor unit capacity and the refrigerant pipe length Lr may be provided.

As described above, the air conditioner of the present invention controls the rotational speed of the compressor during the defrosting operation within the control range that corresponds to the capacity ratio, the total sum of the rated capacity of the indoor units, or the refrigerant pipe length. Accordingly, even in the case where the refrigerant circulation amount during the defrosting operation is reduced due to the installation state of the air conditioner, it is possible to prevent the suction pressure from being significantly reduced and falling below the performance lower limit value of the compressor. Thus, the damage to the compressor can be prevented. In addition, it is possible to prevent a case where the suction pressure falls below the performance lower limit value of the compressor and thus the low-pressure protection control is executed. Therefore, a case where the defrosting operation is interrupted by the low-pressure protection control, the defrosting operation time is thus extended, and the restoration of the heating operation is delayed does not occur.

It should be noted that the description has been made on the case where the worker operates the installation information input unit 250 and manually inputs the rated capacity of the indoor units 5a to 5c at the time of the initial setting during the installation of the air conditioner 1 in each of the embodiments described above. The indoor units 5a to 5c may store the model information including the information on the own rated capacity in the storage units 520a to 520c, respectively. Furthermore, the model information may be transmitted from the indoor units 5a to 5c to the outdoor unit 2 at the time of the initial setting during the installation of the air conditioner 1. Here, the model information includes the information of the indoor units 5a to 5c, such as the model names and the identification numbers of the indoor units 5a to 5c, that is required for management and the control of the air conditioner 1, in addition to the rated capacity of the indoor units 5a to 5c.

In addition, instead of being input by the worker who operates the installation information input unit 250, the refrigerant pipe length Lr may be calculated by the CPU 210 of the outdoor unit 2 as will be described below. A relational expression between an operation state amount, such as a supercooling degree at the refrigerant outlet in the case where the outdoor heat exchanger 23 functions as the condenser and a low-pressure saturation temperature that is obtained by using the suction pressure detected by the low-pressure sensor 32, and the refrigerant pipe length Lr (for example, a table that defines the refrigerant pipe length Lr in accordance with a supercooling degree) is stored in the storage unit 220 of the outdoor unit control means 200. The CPU 210 obtains the operation state amount at a time that the air conditioner 1 performs the cooling operation, so as to obtain the refrigerant pipe length Lr by using the above expression.

DESCRIPTION OF REFERENCE SIGNS

1 Air conditioner
2 Outdoor unit
5a to 5c Indoor unit
8 Liquid pipe
9 Gas pipe
21 Compressor
22 Four-way valve
23 Outdoor heat exchanger
27 Outdoor fan
32 Low-pressure sensor
35 Heat exchange temperature sensor
36 Ambient air temperature sensor
51a to 51c Indoor heat exchanger
55a to 55c Indoor fan
100 Refrigerant circuit
200 Outdoor unit control means
210 CPU
220 Storage unit
240 Sensor input unit
250 Installation information input unit
300a to c Compressor rotational speed table
P Capacity ratio
Pi Total sum of indoor unit capacity
Po Total sum of outdoor unit capacity
Lr Refrigerant pipe length
Cr Rotational speed of compressor

The invention claimed is:
1. An air conditioner comprising:
an outdoor unit having a compressor, a flow passage switching unit, an outdoor heat exchanger, a low-pressure detector, and an outdoor unit controller;
one or more indoor units, each one of the indoor units having an indoor heat exchanger; and
a liquid pipe and a gas pipe for coupling the outdoor unit and the one or more indoor units, wherein
the low-pressure detector detects suction pressure that is pressure of a refrigerant suctioned into the compressor,
the outdoor unit controller is configured with programming such that the outdoor unit controller controls a rotational speed of the compressor during a defrosting operation within a predetermined rotational speed control range in accordance with the suction pressure received from the low-pressure detector,
the rotational speed control range is defined in accordance with a capacity ratio that is a value obtained by dividing a total sum of rated capacity of the one or more indoor units by a total sum of rated capacity of the outdoor unit,
when the capacity ratio is lower than a predetermined capacity ratio, the outdoor unit controller is configured with programming such that the rotational speed of the compressor is set to a first range,
when the capacity ratio is equal to or more than the predetermined capacity ratio, the outdoor unit controller is configured with programming such that the rotational speed of the compressor is set to a second range, and
a minimum value of the first range is smaller than a minimum value of the second range, and a maximum value of the first range is smaller than a maximum value of the second range.

2. An air conditioner comprising:
an outdoor unit having a compressor, a flow passage switching unit, an outdoor heat exchanger, a low-pressure detector, and an outdoor unit controller;
one or more indoor units, each one of the indoor units having an indoor heat exchanger; and
a liquid pipe and a gas pipe for coupling the outdoor unit and the one or more indoor units, wherein
the low-pressure detector detects suction pressure that is pressure of a refrigerant suctioned into the compressor,
the outdoor unit controller is configured with programming such that the outdoor unit controller controls a rotational speed of the compressor during a defrosting operation within a predetermined rotational speed control range in accordance with the suction pressure received from the low-pressure detector,
the rotational speed control range is defined in accordance with a refrigerant pipe length that is lengths of the liquid pipe and the gas pipe and either one of a capacity ratio that is a value obtained by dividing a total sum of rated capacity of the one or more indoor units by a total sum of rated capacity of the outdoor unit and the total sum of the rated capacity of the one or more indoor units,
a minimum value of the rotational speed of the compressor within the rotational speed control range is a rotational speed when the capacity ratio is less than a predetermined capacity ratio or the total sum of the rated capacity of the one or more indoor units is less than a predetermined threshold capacity value and the refrigerant pipe length is equal to or higher than a predetermined threshold pipe length,
a maximum value of the rotational speed of the compressor within the rotational speed control range is a rotational speed when the capacity ratio is equal to or more than the predetermined capacity ratio or the total sum of the rated capacity of the one or more indoor units is equal to or more than the predetermined threshold capacity value and the refrigerant pipe length is shorter than the predetermined threshold pipe length,
when the capacity ratio is lower than the predetermined capacity ratio or the total sum of the rated capacity of the one or more indoor units is lower than the predetermined threshold capacity value, and the refrigerant pipe length is equal to or more than the threshold pipe length, the outdoor unit controller is configured with programming such that the rotational speed of the compressor is set to a first range,
when the capacity ratio is lower than the predetermined capacity ratio or the total sum of the rated capacity of the one or more indoor units is lower than the predetermined threshold capacity value, and the refrigerant pipe length is shorter than the threshold pipe length, the outdoor unit controller is configured with programming such that the rotational speed of the compressor is set to a second range, when the capacity ratio is equal to or more than the predetermined capacity ratio or the total sum of the rated capacity of the one or more indoor units is equal to or more than the predetermined threshold capacity value, and the refrigerant pipe length is equal to or more than the threshold pipe length, the outdoor unit controller is configured with programming such that the rotational speed of the compressor is set to a third range, when the capacity ratio is equal to or more than the predetermined capacity ratio or the total sum of the rated capacity of the one or more indoor units is equal to or more than the predetermined threshold capacity value, and the refrigerant pipe length is shorter than the threshold pipe length, the outdoor unit controller is configured with programming such that the rotational speed of the compressor is set to a fourth range, and minimum values of the first, second, third and fourth ranges increase in sequentially from the first range to the second range to the third rage and to the fourth range, and maximum values of the first, second, third and fourth ranges increase in sequentially from the first range to the second range to the third rage and to the fourth range.

3. The air conditioner according to claim 1, wherein
the outdoor unit further comprises a storage unit storing a compressor rotational speed table in which the rotational speed control range is defined in accordance with the capacity ratio, and
the outdoor unit controller is configured with programming such that the rotational speed control range of the compressor is determined in accordance with the compressor rotational speed table.

4. The air conditioner according to claim 1, a minimum value of the rotational speed is a rotational speed when the capacity ratio is less than a predetermined threshold capacity value.

5. The air conditioner according to claim 2, wherein
the outdoor unit further comprises a storage unit storing a compressor rotational speed table in which the rotational speed control range is defined in accordance with the refrigerant pipe length and either one of the capacity ratio and the total sum of the rated capacity of the one or more indoor units, and
the outdoor unit controller is configured with programming such that the rotational speed control range of the compressor is determined in accordance with the compressor rotational speed table.

* * * * *